United States Patent [19]

Froumajou

[11] 4,311,067
[45] Jan. 19, 1982

[54] AUTOMATICALLY CONTROLLED TRANSMISSION DEVICE, IN PARTICULAR FOR AN AUTOMOBILE VEHICLE

[75] Inventor: Armand Froumajou, Osny, France

[73] Assignees: Automobiles Peugeot; Societe Anonyme Automobiles Citroen, both of Paris, France

[21] Appl. No.: 90,576

[22] Filed: Nov. 2, 1979

[51] Int. Cl.³ .......................... F16H 47/00; F16H 3/08
[52] U.S. Cl. ...................................... 74/718; 74/369; 74/371; 74/372; 74/730; 74/731
[58] Field of Search .................... 192/3.25, 3.27, 3.29, 192/3.3, 3.31, 3.28; 74/718, 731, 730, 363, 369, 370, 371, 372

[56] References Cited

U.S. PATENT DOCUMENTS

| | | | |
|---|---|---|---|
| 2,001,762 | 5/1935 | Blood | 74/370 |
| 2,142,199 | 1/1939 | Lysholm et al. | 192/3.27 |
| 2,258,684 | 10/1941 | Lysholm et al. | 192/3.27 |
| 2,619,848 | 12/1952 | Cornagua | 192/3.31 X |
| 2,674,905 | 4/1954 | O'Brien | 74/730 |
| 2,699,236 | 1/1955 | Block | 192/3.29 X |
| 2,723,735 | 11/1955 | Banker | 192/3.31 X |
| 2,737,824 | 3/1956 | Livermore | 192/3.27 X |
| 3,118,524 | 1/1964 | Howard et al. | 192/3.28 |
| 3,185,273 | 5/1965 | Smirl | 192/3.3 |
| 3,239,037 | 3/1966 | Croswhite et al. | 192/3.3 |
| 3,528,324 | 9/1970 | Rovenel | 192/3.27 X |
| 3,747,436 | 7/1973 | Hause | 192/3.27 X |
| 4,173,270 | 11/1979 | Croswhite et al. | 192/3.29 |
| 4,177,694 | 12/1979 | Lachaize | 74/732 |

FOREIGN PATENT DOCUMENTS

| | | | |
|---|---|---|---|
| 532830 | 8/1931 | Fed. Rep. of Germany | 74/370 |
| 550843 | 10/1937 | Fed. Rep. of Germany | 74/370 |
| 2430543 | 2/1980 | France | 74/718 |
| 816893 | 7/1959 | United Kingdom | 192/3.3 |
| 1025591 | 4/1966 | United Kingdom | 192/3.27 |
| 360794 | 1/1973 | U.S.S.R. | 192/3.3 |

Primary Examiner—Leslie Braun
Attorney, Agent, or Firm—Burns, Doane, Swecker & Mathis

[57] ABSTRACT

The device is so designed as to be cheap enough to be sold in large numbers and is particularly simple, compact and has a very low power consumption. It comprises a hydrokinetic converter and a gear mechanism having two forward speeds established by means of two pairs of pinions. It is completed by two clutches and a free-wheel disposed in the converter which provide the connection with the two input elements of the mechanism. These two clutches are actuated by a single slidable plate which moves as a function of parameters such as the speed of the vehicle or the load on the engine. The two clutches are disposed on opposite sides of the plate and one clutch is connected in parallel with the free-wheel.

19 Claims, 5 Drawing Figures

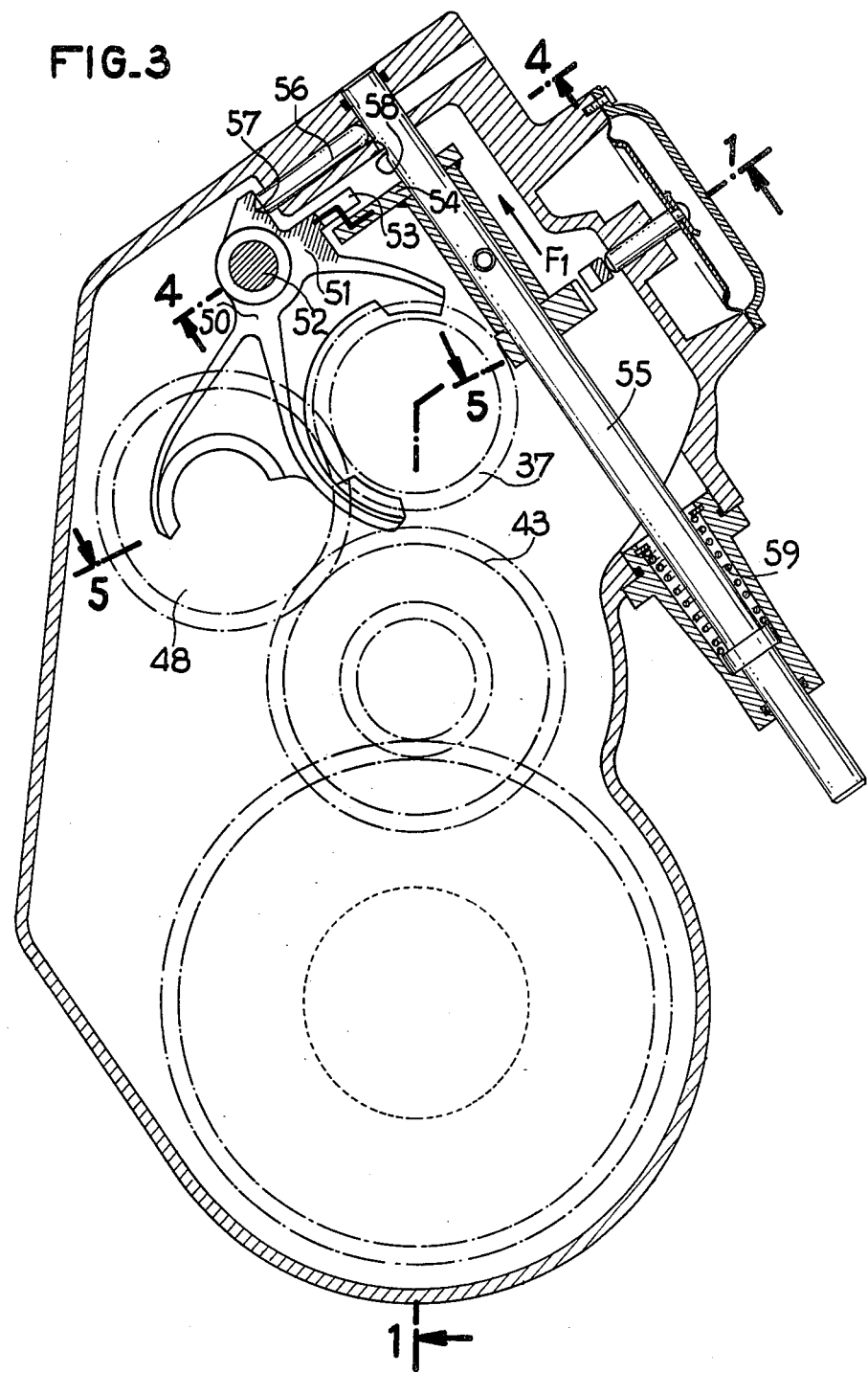

FIG_4
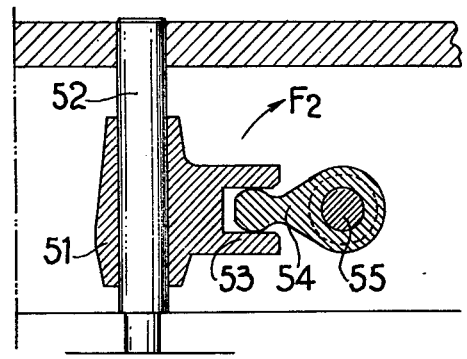
FIG_5
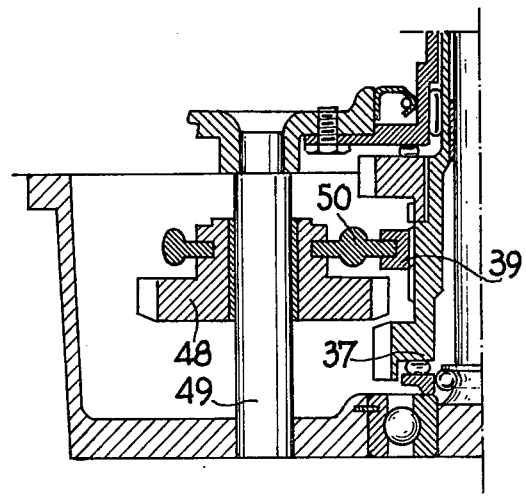

AUTOMATICALLY CONTROLLED TRANSMISSION DEVICE, IN PARTICULAR FOR AN AUTOMOBILE VEHICLE

DESCRIPTION

The present invention relates to a transmission device, in particular for an automobile vehicle, comprising a hydrokinetic converter and a mechanism which has two forward speed ratios and automatically changes the speed ratio as a function of conditions of operation of the engine driving the vehicle.

The advantages of automatic transmissions for automobile vehicles are well known. Unfortunately, the known devices are relatively complicated. They comprise, in particular, multiple brakes and clutches which require a unit comprising directional valves and must be supplied with oil at high pressure. Consequently, these mechanisms are expensive to buy and to run owing to the power they consume.

An object of the invention is to provide a device which satisfies the following requirements which enable it to be used in large numbers:

particularly simple and therefore cheap;

low power consumption in operation and consequently cheap to use;

very compact and consequently suitable for small, cheap vehicles.

This is achieved in a transmission device comprising a hydrokinetic converter whose pump element is driven by the crankshaft of the engine, a mechanism having two forward speed ratios, a first clutch disposed between the turbine element of the converter and a first input element of the mechanism, and a second clutch disposed between the crankshaft and a second input element of the mechanism, wherein the two clutches are disposed inside the converter on each side of a common actuating means, the first clutch being connected in parallel with a unidirectional coupling.

According to other features of the invention:

the actuating means is a plate which is slidably mounted in the converter and is biased in the direction for actuating the first clutch by elastically yieldable means;

this plate separates the inner volume of the converter into two chambers which communicate with each other by way of at least one calibrated passage, one of these chambers containing the second clutch and being capable of being connected to the discharge by a valve means which is actuated as a function of at least one parameter of utilization of the engine or of the associated vehicle;

this valve means is carried by the second input element of the mechanism connected to the second clutch.

The following description gives one embodiment of the invention with reference to the accompanying drawings, in which:

FIG. 3 is a sectional view taken on line 3—3 of FIG. 1;

FIG. 4 is a sectional view taken on line 4—4 of FIG. 3, and

FIG. 5 is a sectional view taken on line 5—5 of FIG. 3.

Figure 1:
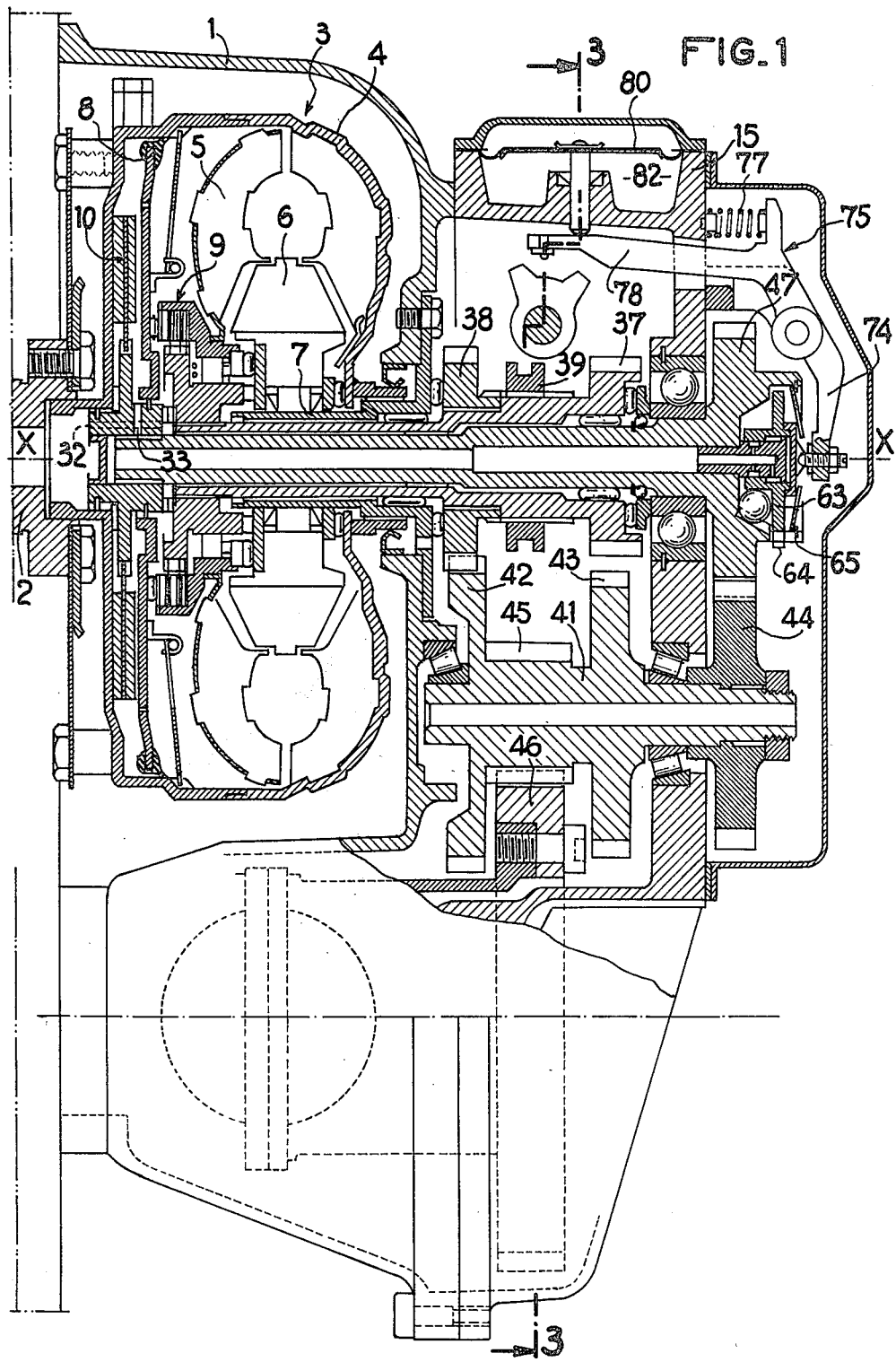
FIG. 1 is a diagrammatic axial sectional view of the device.

The illustrated transmission device, contained in a case 1, is mounted at the end of a crankshaft 2 of an engine (not shown) for driving an automobile vehicle.

Coupled to the crankshaft 2 is a hydrokinetic converter 3 whose case 4 constitutes a pump driving a turbine 5. This converter further comprises a reaction means 6 carried by an extension 7 of the case 1. Mounted inside the converter 3 is a plate 8 disposed between a first clutch 9 and a second clutch 10.

The first clutch comprises two series of discs 11, one series of which is connected to rotate with a driving part 12 connected to the turbine 5 whereas the other series is connected to a driven part 13 rigid with a tubular shaft 14. The latter constitutes a first input element of a gear mechanism which is disposed in a case 15 rigid with the case 1. The axis X—X of the crankshaft 2 is also the axis of the converter 3 and the axis of the shaft 14. Disposed between the driving and driven parts of the clutch 9 is a unidirectional coupling 16 formed by a free-wheel.

The second clutch 10 comprises a disc 17 carried by a hub 18 rigid with a shaft 19 disposed inside the tubular shaft 14. The shaft 19 constitutes a second input element of the gear mechanism.

The plate 8 slides between a cylindrical part 20 of the converter 3 and the hub 18 of the disc 17. This plate 8 carries on its outer periphery a sealing element 21 and divides the inner volume of the converter into two chambers 22, 23 which communicate with each other by way of at least one calibrated orifice 24 in the plate 8. A thrust needle bearing 25 is provided between the plate and the adjacent disc of the clutch 9.

An elastically yieldable diaphragm 26 is connected to rotate, on one hand, with the converter 3 through the medium of notches 27 which cooperate with splines 28 and, on the other hand, with the plate 8 through the medium of slots 29 which cooperate with notches 30 formed in a ring 31 fixed to the plate. The diaphragm 26 is disposed in the volume defined by the clutch 9, the turbine 5 and the plate 8 and biases the plate 8 in the direction in which the discs of the first clutch 9 are urged against each other.

The chamber 22 of the converter 3 is supplied in the usual manner with the lubricating oil of the engine by way of a passageway 32 to actuate the converter. By way of the calibrated orifice 24, this oil also enters the chamber 23 which communicates by way of a passageway 33 with a centre passageway 34 which is formed in the shaft 19 and leads to a valve means 35 described hereinafter.

The tubular shaft 14 carries a splined hub 36 and a gear pinion 37. A gear pinion 38 is freely rotatable on this shaft at the end of the hub 36 opposed to the pinion 37. Mounted on the hub is a slidable claw clutch sleeve 39 having inner splines which cooperate with splines of the hub 36 and are capable of engaging teeth 40 rigid with the freely rotatable pinion 38.

An output shaft 41 carries three gear pinions 42, 43, 44 and a gear pinion 45 engaged with a crown gear wheel 46 of a differential.

The pinion 42 is permanently engaged with the pinion 38 and the pinion 44 is permanently engaged with a gear pinion 47 rigid with the shaft 19.

A movable gear pinion 48 freely rotatable on an intermediate shaft 49 is capable of simultaneously engaging the pinions 37 and 43 (FIGS. 3 and 5).

The sleeve 39 and the movable pinion 48 are driven in translation by a double fork 50 which is rigid with a block 51 carried by a rod 52. Engageable in a fork 53 of the block 51 is a finger member 54 rigid with a rod 55 which is capable of being shifted in rotation and in translation through known means by a selector lever available to the driver of the vehicle.

Disposed between the rod 55 and the block 51 is a locking finger member 56 whose end cooperates with one of three recesses 57 formed in the block 51 and respectively corresponding to the positions of forward speed, neutral and reverse speed, the other end of the finger member cooperating with a cavity 58 formed on the rod 55. The length of the finger member 56 is such that the double fork 50 can only be shifted in translation when the finger member 56 is engaged in the cavity 58 which corresponds, for the rod 55, to the position in which the finger member 54 is between the two branches of the fork 53.

A spring 59 disposed around the rod 55 biases the latter to the position in which the double fork 50 is held stationary by the finger member 56 and the finger member 54 is disengaged from the fork 53 (FIG. 3).

The valve means 35 of the centre passageway 34 of the shaft 19 is disposed at the end of the latter opposed to the clutch 10 in a cavity comprising a part conical portion 60. This valve means comprises a centre member 61 rigid with the shaft 19 and a slidable outer member 62 forming a slide. The latter carries a ring 63 provided with radial extensions 64 engaged in recesses 65 in the shaft 19.

The centre member 61 of the valve means comprises a blind centre conduit 66 which connects the passageway 34 to two radial passageways or ports 67, 68. Depending on the position of the slide 57, the passageway 67 is either closed or open. The passageway 68 communicates with a recess 69 formed between the centre portion 61 and the slide 62 so that, when the passageway 67 is closed, the pressure of the liquid is exerted on a shoulder 70 of the slide and exerts on the latter an axial force which is oriented in the direction for closing the passageway 67.

Balls 71 are disposed around the slide 62 between the part-conical portion 60 and the ring 63. When the shaft 19 is driven in rotation, centrifugal force is exerted on the balls which tend to move away from the axis X—X along the generatrices of the part-conical portion 60 and this biases the slide 62 in the direction in which it opens the passageway 67.

The slide 62 is held in position by a cap 72 and a diaphragm spring 73.

Acting on the cap 72 is an arm 74 of a lever 75 which is mounted to pivot about a shaft 76 and is biased by a spring 77. The lever 75 bears against the cap 72 through an adjustable screw 74a. This lever 75 has another arm 78 which is held by the spring 77 in contact with a rod 79 carried by an elastically yieldable membrane 80. This membrane defines with a cavity 81 in the case 15 a chamber 82 in which there prevails the depression which prevails in the induction pipe of the engine.

The arm 78 of the lever 75 may moreover cooperate with two bosses 83, 84 carried by the rod 55.

It should also be noted that any known device for braking the shaft 14 may be employed for holding it stationary before engaging the forward or reverse speed.

It is believed to be unnecessary to describe herein the details of elements such as the rings, bearings, rolling bearings, sealing means, etc. which are conventional in this art and the use of which is perfectly well known to a person skilled in the art.

The transmission device just described operates in the following manner:

In the neutral position of the device, with the vehicle stationary and the engine idling, the various elements are in the positions shown in the drawing.

The shaft 19, connected to the wheels of the vehicle through the pair of gear pinions 44, 47, is stationary and the balls 71 exert no thrust on the slide 62. The latter closes the discharge passageway 67 so that the same oil pressure prevails in the two chambers 22 and 23 of the converter on each side of the plate 8. The action of the diaphragm 26 on the plate 8 has for effect to actuate the clutch 9 and release the clutch 10.

In order to engage the forward speed, the rod 55 is first displaced in translation in the direction of arrow $F_1$ (FIG. 3). The finger member 54 is engaged in the fork 53 and the cavity 58 moves into alignment with the locking finger member 56. The rod 55 is then shifted in rotation in the direction of arrow $F_2$ (FIG. 4) so that the double fork 50 engages the sleeve 39 with the teeth 40 of the pinion 38 and renders the latter rigid with the shaft 14.

The torque of the engine is then transmitted to the wheels through the converter 3, the clutch 9, the freewheel 16, the shaft 14 and the couple of pinions 38, 42 and provides the first speed or gear ratio. The shaft 19 is driven in proportion to the speed of the vehicle through the pair of pinions 44, 47.

Beyond a certain speed, the centrifugal force exerted on the balls 71 is sufficient to cause the slide 62 to open the passageway 67. There then occurs a drop in the pressure of the oil which is detected in the cavity 69 of the slide 62 and in the chamber 23 of the converter. The pressure drop in the cavity 69 has for effect to accentuate the displacement of the slide 62 so that there is no phenomenon of instability. The pressure drop in the chamber 23, while the pressure remains in the chamber 22, causes the plate 8 to move and release the clutch 9 and actuate the clutch 10.

The engine torque is then transmitted to the wheels through the clutch 10, the shaft 19 and the pair of pinions 47, 44 and this provides the second speed or gear ratio. This ratio is established in by-passing the converter 3.

The speed at which the gear change occurs varies as a function of the level of the depression which prevails in the induction pipe and therefore as a function of the load on the engine. When the depression decreases, the rod 79 descends and tends to move the branch 74 of the lever 75 away from the cap 72 in opposition to the action of the spring 77. The speed at which the change from the first to the second gear ratio occurs consequently decreases in value.

Figure 2:
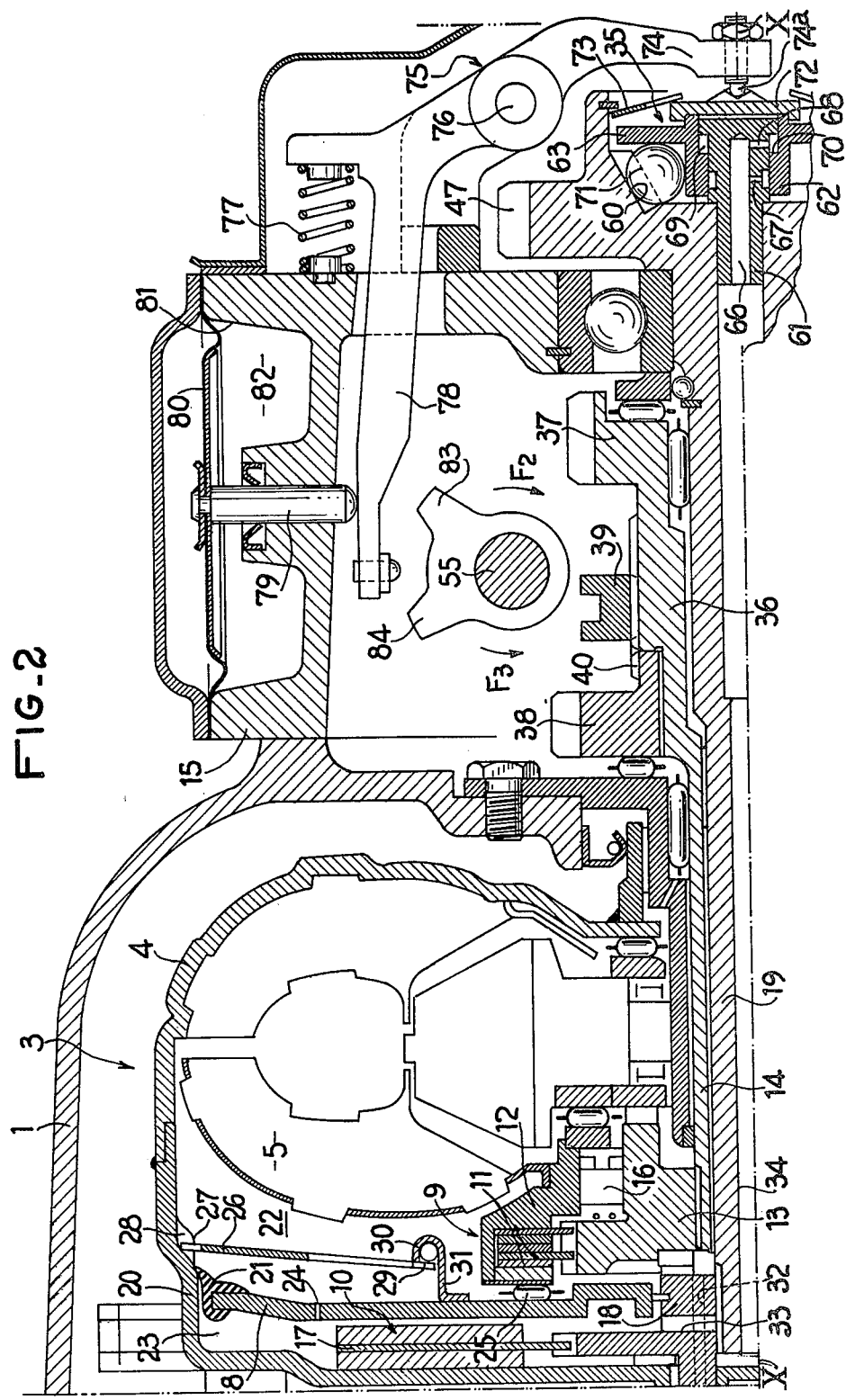
FIG. 2 is an axial view thereof to a larger scale.

If for any reason the driver does not wish to use the second speed, it is possible to cause the transmission mechanism to remain in first speed. For this purpose, it is sufficient to rotate the rod 55 in the direction of arrow $F_2$ (FIG. 2) so that the boss 84 blocks the arm 78 of the lever 75. The slide 62 is then held stationary and the clutch 9 remains actuated. This rotation of the rod 55 occurs without driving the double fork 50 since the finger member 54 is outside the fork 53.

In order to engage the reverse speed, the rod 55 is shifted in translation as before: the finger member 54 engages the fork 53 and the cavity 58 is placed in alignment with the locking finger member 56. The shaft 55 is then rotated in the direction of arrow F₃ so that the double fork 50 brings the movable pinion 48 into engagement with the pinions 37 and 43. At the same time, the boss 83 blocks the arm 78 of the lever 75.

The engine torque is then transmitted to the wheels through the converter 3, the clutch 9 and the free-wheel 16, the shaft 14 and the pinions 37, 48 and 43.

The use of a single plate 8 for alternately actuating two clutches 9 and 10 is made possible owing to the use of the clutch 9 and free-wheel 16 in parallel.

When driving the vehicle, the torque is transmitted principally through the free-wheel 16 and only partly through the clutch 9. The latter may consequently have relatively small dimensions and requires only a small actuating force on the part of the diaphragm 26.

Consequently, a low oil pressure is sufficient for actuating the clutch 10 in opposition to the action of the diaphragm 26 when the chamber 23 is connected to the discharge. The clutch 9 can still be used to cause the engine to act as a brake when the accelerator pedal is released.

Further, the free-wheel prevents the engine from racing during the transitional stages between changing from one of the two speeds to the other.

It will be clear from the foregoing that the desired advantages have been achieved, namely:

owing to the type and disposition of the clutches 9,10, the position of the free-wheel 16 and the function of the plate 8, the overall size of this part of the device disposed in the converter is particularly small;

the chosen mode of operation of the two clutches avoids the use of an additional source of fluid under pressure since the oil contained in the converter is sufficient to achieve this operation and also avoids the conventional unit of valves.

The control means responsive to the speed of the vehicle and to the load on the engine are incorporated in the device and are also of particularly simple and compact construction.

Having now described my invention what I claim as new and desire to secure by Letters Patent is:

1. A transmission device, in particular for an automobile vehicle, comprising a hydrokinetic converter having a pump element and a turbine element, a mechanism having means for providing two forward gear ratios and two inlet elements, a first clutch disposed between said turbine element and said first input element, means connected to rotate with said pump element, a second clutch disposed between the means connected to rotate with said pump element and said second input element, said two clutches being disposed inside the hydrokinetic converter, a common actuating means for actuating said clutches being interposed between said clutches and a unidirectional coupling connected in parallel with said first clutch.

2. A device as claimed in claim 1, wherein the common actuating means is a plate mounted to be axially slidable in the converter.

3. A device as claimed in claim 2, further comprising elastically yieldable means for biasing the plate in a direction for actuating the first clutch.

4. A device as claimed in claim 3, wherein said converter has a case and the elastically yieldable means comprise a diaphragm spring which is prevented from rotating relative to said case and to said plate and disposed in the volume defined in said case by said turbine element, said plate and said first clutch.

5. A device as claimed in claim 2, wherein said first clutch comprises multiple discs of relatively small diameter and is disposed with said unidirectional coupling between said turbine element, said plate and said first input element, said second clutch having a larger diameter and a smaller axial dimension.

6. A device as claimed in any one of the claims 2 to 5, wherein said plate divides the inner volume of the converter into two chambers and at least one calibrated passageway puts the two chambers in communication with each other, one of said chambers contains said first clutch and is connected to a source of liquid under pressure and the other of said chambers contains said second clutch and a valve means which is actuated as a function of at least one parameter of utilization of an engine or vehicle associated with the device is connected to said other chamber to control the connection thereof to the discharge.

7. A device as claimed in claim 6, wherein the calibrated passageway is formed in said plate.

8. A device as claimed in any one of the claims 1 to 5, wherein said first element is a tubular shaft and said second element is a second shaft which is disposed concentrically within the tubular shaft and said mechanism comprises a first gear pinion freely rotatably mounted on the tubular shaft, and a slidable claw clutch sleeve, a second gear pinion connected to rotate with the second shaft, an output shaft, a third gear pinion and a fourth gear pinion which are rigid with said output shaft and respectively permanently engage said first gear pinion and second gear pinion, and valve means carried by an end of said second shaft remote from the converter, the valve means being provided for connecting said second chamber to the discharge, said second shaft defining a passageway which connects said second chamber to the valve means.

9. A device as claimed in claim 8, comprising a fifth gear pinion and a sixth gear pinion which are respectively rigid with said tubular shaft and said output shaft, an intermediate shaft, and a movable gear pinion carried by said intermediate shaft, said fifth gear pinion and sixth gear pinion being simultaneously engageable with said movable gear pinion for providing a reverse speed for the transmission device.

10. A device as claimed in claim 8, wherein the valve means comprise a fixed member and a movable member which are axially relatively movable and define a discharge port for said passageway of said second shaft, means responsive to centrifugal force and combined with said valve means to effect said relative axial displacement between said fixed member and movable member.

11. A device as claimed in claim 10, wherein said means responsive to centrifugal force comprise inclined ramps defined by said second shaft and balls interposed between said ramps and said movable member.

12. A device as claimed in claim 10, wherein said fixed member of the valve means comprises means defining a blind axial conduit connected to said passageway of said second shaft and two radial passageways which are connected to said blind axial conduit and open onto a periphery of said fixed member, said movable member being operative to selectively open and close one of said radial passageways, depending on the position of the movable member, the other of said radial passageways communicating with a cavity defined between said fixed member and said movable member.

13. A device as claimed in claim 8, wherein the valve means is connected to rotate with said second shaft which carries the valve means.

14. A device as claimed in claim 10, comprising a cap and elastically yieldable means for maintaining said movable member of the valve means in position, said yieldable means tending to maintain said movable member in the position for closing said discharge port.

15. A device as claimed in claim 10, comprising means subjected to opposing actions of a depression box and a spring for biasing said movable member of the valve means.

16. A device as claimed in claim 15, wherein said means subjected to opposing actions is an L-shaped lever mounted to pivot about a pin and having a branch which bears against said movable member of the valve means and another branch which is connected to be subjected to the action of said depression box.

17. A device as claimed in claim 10, comprising means for blocking said movable member of the valve means in the position for closing the discharge port.

18. A device as claimed in claim 17, comprising a fifth gear pinion and a sixth gear pinion which are respectively rigid with said tubular shaft and said output shaft, an intermediate shaft, and a movable gear pinion carried by said intermediate shaft, said fifth gear pinion and sixth gear pinion being simultaneously engageable with said movable gear pinion for providing a reverse speed for the transmission device, and means for actuating the slidable claw clutch sleeve and the movable gear pinion, said actuating means being adapted to block said movable member of the valve means under certain conditions.

19. A device as claimed in claim 18, wherein said means for blocking said movable member comprise a slidable and rotatable rod which carries at least one boss cooperating with said lever.

* * * * *